(12) United States Patent
Diec

(10) Patent No.: US 7,072,938 B2
(45) Date of Patent: Jul. 4, 2006

(54) METHOD AND SYSTEM FOR DISTRIBUTING OBJECTS OVER A NETWORK

(75) Inventor: Thanh Diec, Sunnyvale, CA (US)

(73) Assignee: Siebel Systems, Inc., San Mateo, CA (US)

( * ) Notice: Subject to any disclaimer, the term of this patent is extended or adjusted under 35 U.S.C. 154(b) by 620 days.

(21) Appl. No.: 10/394,992

(22) Filed: Mar. 21, 2003

(65) Prior Publication Data
US 2003/0187921 A1 Oct. 2, 2003

Related U.S. Application Data

(63) Continuation of application No. 09/983,064, filed on Oct. 23, 2001, now Pat. No. 6,604,128, which is a continuation of application No. 09/451,487, filed on Nov. 30, 1999, now Pat. No. 6,324,568.

(51) Int. Cl.
*G06F 16/16* (2006.01)
(52) U.S. Cl. ............. 709/203; 709/227; 719/332; 715/513; 345/619
(58) Field of Classification Search ............ 709/203, 709/227; 715/513; 719/332
See application file for complete search history.

(56) References Cited

U.S. PATENT DOCUMENTS

| | | | |
|---|---|---|---|
| 5,634,006 A | | 5/1997 | Baugher et al. |
| 5,859,971 A | | 1/1999 | Bittinger et al. |
| 5,867,661 A | * | 2/1999 | Bittinger et al. ............ 709/227 |
| 6,012,067 A | * | 1/2000 | Sarkar ............... 707/103 R |
| 6,057,842 A | * | 5/2000 | Knowlton et al. ........... 715/788 |
| 6,061,695 A | * | 5/2000 | Slivka et al. ............ 715/513 |
| 6,112,242 A | * | 8/2000 | Jois et al. ............... 709/225 |
| 6,138,152 A | | 10/2000 | Jalote et al. |
| 6,161,123 A | | 12/2000 | Renouard et al. |
| 6,233,543 B1 | | 5/2001 | Butts et al. |
| 6,324,568 B1 | | 11/2001 | Diec |
| 6,397,253 B1 | | 5/2002 | Quinlan et al. |
| 6,456,308 B1 | * | 9/2002 | Agranat et al. ............ 715/854 |

OTHER PUBLICATIONS

Forta, Ben, "The COLDFUSION web application construction kit," (1998), Table of Contents, pp. 32-35 and Appendix A (pp. 790-872).

"CGI: Common Gateway Interface", http://www.w3.org/DGI/, (Printed from Website on Nov. 5, 1999), p. 1-2.

"CGI: Common Gateway Interface," http://www.hoohoo.ncsa.uiuc.edu/cgi8/primer.html, (Printed from Website on Nov. 9, 1999), p. 1-3.

(Continued)

*Primary Examiner*—Frantz B. Jean
(74) *Attorney, Agent, or Firm*—Perkins Coie LLP

(57) ABSTRACT

A method and system for passing information between a client, as a browser, and a server, as an application server, where the information is passed through a web server for processing between the application server and the browser. The webserver loads one or more template files. These template files contain standard markup language plus special tags. These tags are parsed, translated into commands for the application server, and sent to the application server. The application server returns the objects called to the web server, which passes the called objects to the client. The session is persistent.

21 Claims, 3 Drawing Sheets

OTHER PUBLICATIONS

"Common Gateway Interface RFC Project Page," http://Web.Golux.Com/coar/cgi, (Printed from Website on Nov. 9, 1999), p. 1-3.

"CGI Environment Variables," http://hoohoo.ncsa.uiuc.edu/cgi/env.html, (Printed from Website on Nov. 5, 1999), p. 1-7.

"CGI Command line options," http://hoohoo.ncsa.uiuc.edu/cgi/cl.html, (Printed from Website on Nov. 5, 1999) p. 1.

"CGI Environment Variables," http://hoohoo.ncsa.uiuc.edu/cgi/env.html, (Printed from Website on Nov. 5, 1999) p. 1-3.

"CGI Script Input," http://hoohoo.ncsa.uiuc.edu/cgi/in.html, (Printed from Website on Nov. 5, 1999) p. 1.

"CGI Script Output," http://hoohoo.ncsa.uiuc.edu/cgi/out.html, (Printed from Website on Nov. 5, 1999) p. 1-2.

"Common Gateway Interface," http://hoohoo.ncsa.uiuc.edu/cgi/intro.html, (Printed from Website on Nov. 5, 1999) p. 1-2.

"Mosaic for X version 2.0 fill-Out Form Support," wysiwyg://www.ncsa.uiuc../Docs/fill-out-forms/overview.html, (Printed from Website on Nov. 5, 1999) p. 1-6.

"Decoding FORMs with CGI," http://hoohoo.ncsa.uiuc.edu/cgi/forms.html, (Printed from Website on Nov. 5, 1999) p. 1-2.

* cited by examiner

FIG. 2

THIS SIMPLE, PLAIN HTML LAYOUT FILE WOULD PRODUCE A PAGE RENDERED BELOW.

Opportunity Entry Applet        Channels   Fullscreen

Account I-NET    Site BP-      Opportunity COE WAN         Revenue 0        Prob % 0
                 Houston                   Infrastructure Address 2 Riverview Suite 900   Description For Quote      Close Date 10/29/1996   Created 10/29/1996
                                            purpose only                           21:35:33

Sales DOWEN                Committed no
                                Team

City Houston     State TX       Territory                  Sales                   Lead Quality
                                                           Cycle Zip 77056        Country        Reason                     Source
                                Won/Lost A WEB DESIGNER CAN SPEND SOME EFFORT, AND CREATE A
VERY ATTRACTIVELY LAYOUT PAGE USING THIS MECHANISM.

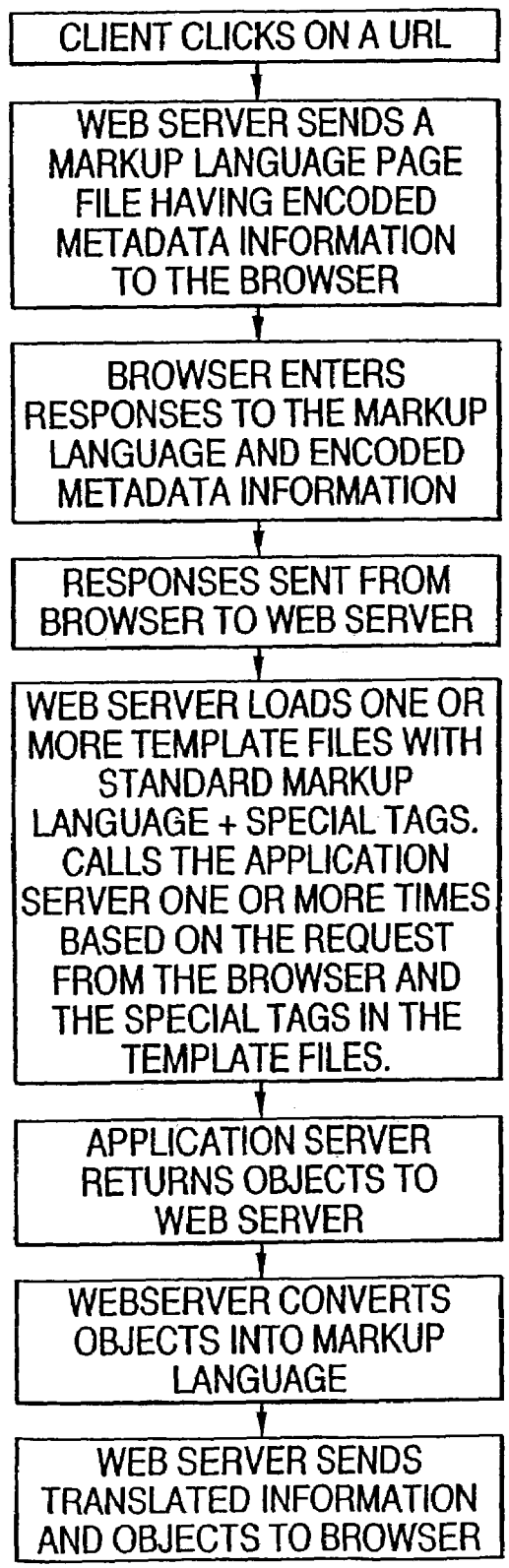

METHOD AND SYSTEM FOR DISTRIBUTING OBJECTS OVER A NETWORK

CROSS-REFERENCE TO RELATED APPLICATIONS

This Application is a continuation of application Ser. No. 09/983,064, filed Oct. 23, 2001 now U.S. Pat. No. 6,604, 128, which is a continuation of application Ser. No. 09/451, 487, filed Nov. 30, 1999, now U.S. Pat. No. 6,324,568, issued Nov. 27, 2001, each of which are herein incorporated by reference in their entirety.

FIELD OF THE INVENTION

The invention relates to client-server systems, and especially to web based client-web server-application server systems for delivering object data from the application server through the web server to the client.

BACKGROUND OF THE INVENTION

Normally, web communications, including data requests and data delivery, are carried out in the TCP/IP (Transmission Control Protocol/Internet Protocol) environment via a CGI (Common Gateway Interface) application. The Web page displayed on the client browser is linked to the CGI application in a remote server through a URL (Universal Resource Locator) embedded in the Web Page. The end user at the client clicks on the URL, which launches the CGI application on the Web Server, and causes a form, typically in HTML or XML format, to be delivered to the end-user at the client. The end user at the client supplies the requested information, as a search request, an order, a user id and password, or the like, and sends the data back to the CGI program. The "send" operation, typically a mouse click on a virtual pushbutton on the screen, terminates the CGI session. That is, the CGI session is not persistent.

Meanwhile, the CGI application translates the query or information into a form or format understandable by an application running on an application server. The application server, or more specifically, the application running on the application server, can be a database application or an e-commerce application, or the like. The web server sends the query or information to the application server. The application server performs the requested task, as a database search, an order entry, or the like, and transmits a response back to the CGI application. The CGI application receives the response, translates the response, formats or reformats the response into a markup language format, initiates a new session with the client, and sends the markup language formatted information back to the client.

Within the limits of markup languages, as HTML, DHTML, XML, and the like, this is satisfactory. However, it is frequently necessary to preserve the logic, metadata, or schema of the transmitted information sent by the application server. This requires persistence across multiple requests, special tags, translation of the special tags, and the ability to send and receive objects not supported by markup languages.

SUMMARY OF THE INVENTION

According to the invention there is provided a method and system for passing information between a client and an application server through a web server using a markup language. The system and method include a browser running on the client for an end user to enter information for the application server and receive information from the application server, where the application server contains application resources, as database management system and data, or an e-commerce application. The web server provides communications between the application server and the browser, and includes an interface application running on the web server. The interface application sends a markup language form with encoded metadata information in standard markup language form to the client, and receives information, including responses to the encoded metadata information, from the client. The interface on the web server sends information to the application server based upon the information received from the client and information in response to the encoded metadata information. These are translated into a form understandable by the application and sent to the application. The interface receives responsive information from the application server, such as responsive information including function objects and application objects called by the embedded tags. The interface converts the responsive information received from the application server into markup language, and transmits the converted information to the client. The session is persistent; that is, it does not end with the submission from the client to the web server.

The files that contain (HTML+special tags) are stored on the webserver. The typical sequence of events is:

1. The user using the browser either clicks on a link, or types in a URL. This request is sent from the browser to the webserver and/or the web engine.
2. The webserver and/or web engine gets the request, and loads one or more files containing a markup language and special tags.
3. The webserver and/or web engine reads the file(s), translates those special tags, and makes calls to the application server.
4. The webserver and/or web engine sends back a response to the browser. The response contains application specific data, as Siebel data, metadata information, all encoded in standard markup language (HTML). There need not be special tags in the response.

THE FIGURES

FIG. 2 shows a screen view of the web page produced by the HTML code with tags of the invention, using the tag codes shown in the specification.

Figure 1:
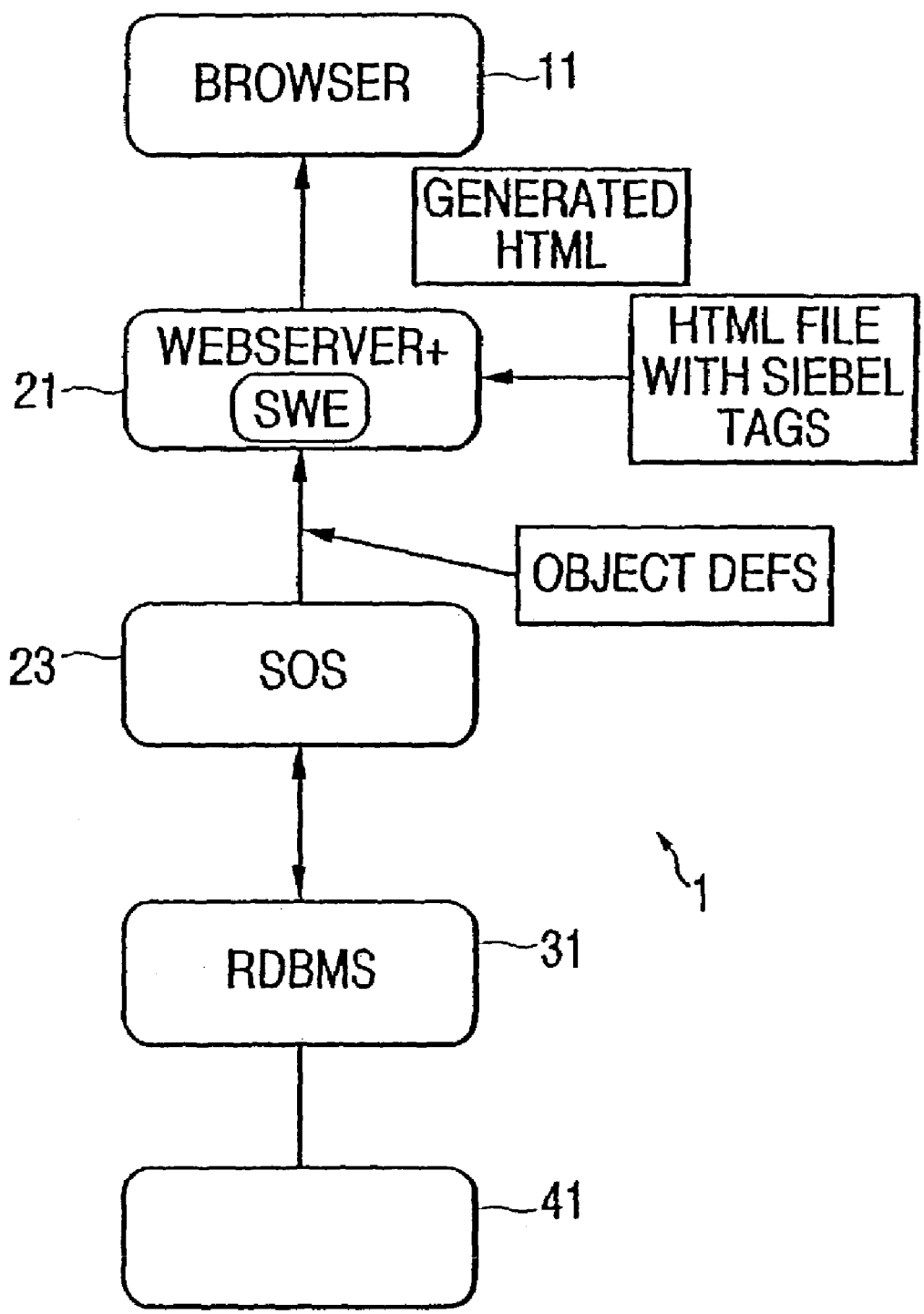
FIG. 1 is a schematic view of the system of our invention, including the browser, the web server, the application server, and the database. Also shown is the generated HTML view at the browser, the HTML file with tags as an input to the web server, and the object definitions as an input to the web server.

FIG. 3 shows a flow chart of the method of the invention, where the client clicks on a URL. In response to the selected URL, the web server sends a markup language page file to the browser. The browser enters responses to the markup. These responses are sent from browser to web server. The web server sends the responses to the application server. The application server returns objects to web server. The web server converts these objects into markup language, and server sends translated information and objects to the browser.

DETAILED DESCRIPTION OF THE INVENTION

The invention provides a method and system for passing information between a client and an application server through a web server using a markup language. The elements of the system are a browser running on the client for an end user to interact, through the web server, with the application server. Specifically, as shown in FIG. 3, the client clicking on a URL on the browser screen begins the session. In response to the selected URL, the webserver and/or web engine loads one or more files containing standard markup language (typically HTML), plus special tags. The webserver and/or web engine calls the application server to get metadata plus siebel data, replaces the special tags in the file with constructs based on standard markup language. The files that contain the markup language and the special tags are stored on the webserver. The typical sequence of events is:

1. The user using the browser either clicks on a link, or types in a URL. This request is sent from the browser to the webserver and/or web engine.
2. The webserver and/or web engine gets the request, and loads one or more files containing a markup language, as HTML, plus the special tags.
3. The webserver and/or web engine reads the file(s), translates the special tags, and makes calls to the application server.
4. The webserver and/or web engine sends back a response to the browser. The response contains application specific data, as Siebel data, metadata information, all encoded in standard markup language, as HTML. There are no special tags in the response.

These responses are sent from browser to web server, for example in URL command language. The web server translates or otherwise converts the responses into a suitable form for the application server, and sends the responses to the application server. The application server returns objects to web server. The web server converts these objects into markup language, and the web server then sends translated information and objects to the browser. Thus, according to our invention the end user enters information to send to the application server and receives information from the application server. The method and system of the invention further includes an application server containing application resources; and a web server providing communications between the application server and the browser. The system also includes an interface application program running on the web server. This interface application program sends a markup language form, including encoded metadata information, to the client, and receives information, including responses to the encoded metadata information, from the client in response to the markup language form.

This information is sent from the web server to the application server based upon the information received from the client, including the information that is in response to encoded metadata information. The interface receives responsive information from the application server. This responsive information includes function objects, data objects, and application objects called by the embedded tags. This information received from the application server is converted into markup language, and transmitted to the client.

The run time environment of the method and system of our invention is a Thin Client-Server system, such as an HTML Thin Client-Server system. It includes the components shown in FIG. 1. Specifically, the system 1 includes one or more browsers 11. Typically, the browsers are running on remote machines connected over an internet, an intranet, a wide area network, or a local area network, and may thus be characterized as being located remotely on other machines. The system also includes a web server 21 with a web engine 23, as a Siebel Web Engine (SWE), as a component running within the web server 21. Finally, the system includes an application server 31, such as a Siebel Object Manager (SOM). Typically, the application server 31 is a separate process that can run either remotely or on the same machine 21 as the web server 23. The web server 23 communicates with the application server 31 to run applications on the application server 31, for example to read and write data to a database 41, or to engage in financial, marketing, sales, system administration, or e-commerce applications. When the application server 31 accesses a database 41, the database may be a relational database 41.

According to the invention, the web engine 23 defines a set of tags that end users can embed within a normal HTML file. The HTML file is an otherwise ordinary HTML file. It can contain HTML, or Javascript, or VBscript or XML. The tags provide directives to the web engine 23 as to what data to fetch, and where and how to incorporate the fetched data with the rest of the HTML page.

The tags of our invention provide fine-grain integration between and control of the data, and the rest of the HTML page. This fine-grained integration and control is important, because aesthetics of a web page, and the scalability and flexibility of schema and metadata in the underlying databases, as well as what data are fetched, presented, and integrated are important to customers.

The specific format of the tags is not critical. However, to preserve the programming paradigm of HTML, the tags can have for format <TagCall TagNameCall="TagName"/> where TagCall indicates that the command inside the braces is a tag call, TagNameCall indicates the name of the object being called, and "/" ends the tag. For example, in the embedded tag <siebelApplet siebelName="Opportunity List Applet"/>

"siebelApplet" indicates that the embedded tag is a call of a Siebel Applet object, SiebelName indicates that the name of the applet follows after the equal sign inside the quotation marks, Opportunity List Applet is the applet, and/indicates the end of the embedded tag.

At runtime, the tags specify what objects, e.g. views, applets, fields, and other objects to call or fetch from the database or application server. The web engine parses the HTML file with tags, translates and reformats the information going to the application, and receives a reply from the application. After making one or more calls to the application server, the web engine constructs the final HTML page by combining the content of the template file with special tags stripped out and replaced with the referenced objects as data, and sends the final HTML page back to the browser. Throughout the above-described process, the connection between the client or browser and the web server is persistent.

Here is a typical HTML page for a view:
<html>
<body>
<p>
<b><font size=4 color=990000><siebelField siebelName="_title"/></font></b>
<p>
<hr>

```
<siebelApplet siebelName="Opportunity List Applet"/>
<hr>
<siebelApplet    siebelName="Opportunity    Contact
    Applet"/>
</body>
</html>
```

The tags <siebelApplet siebelName="Opportunity List Applet"/> and <siebelApplet siebelName="Opportunity Contact Applet"/> are embedded tags according to the invention.

They are used for embedding objects within the page. In this view page, there are two tags:
    siebelField
    siebelApplet The tag specifies the object type. In this case, we have an applet, where the name attribute specifies which applet. We also have a field, with a special, reserved name: _title.

The name of the applets must match those specified in the repository, database 41 or application server 31.

The rest of the view is written in normal HTML. The user can put in whatever HTML he wants to use. The web engine, for example, a Siebel Web Engine, will read in the file, search for the "siebel" tagged sections or other tagged sections, and replace the tagged sections with its own generated HTML. The non-tagged sections are sent to the web server as is.

Similar to the view object, an applet object will have an external HTML as well. Here is an example of a form applet HTML file.

e.g. XML, that the Tags can be integrated closely into. The Web Engine parses the file, strips out only the embedded tags, and replaces them with data or other objects. The rest of the text is passed through as is. Therefore, customer responses and input can be integrated tightly with native file format, HTML in this instance.

The tags are closely integrated with the native text file format, and the web engine passes through any text other than the tags. In this way, end users can easily, and flexibly construct different kinds of pages: read only text, text in table format, comma separated list format, bullet list format, a query page, a sort page, a page to edit data in, etc.

One aspect of the invention is that the tags are not simply translated by the web engine into objects, such as data objects. Some tags are translated into, for example, links. When a user clicks on the thusly created links, the web engine or web server created links will supply the browser with information about what page, and objects (in the hierarchy) to fetch from the web server called by the link.

Other tags, such as the tag <siebelMethod> can provide directives to web engine to create many different kinds of links or buttons with actions to go back to the web server. Examples of SiebelMethods include: Navigate, EnterQuery, EnterSort, NewRecord, EditRecord, CommitRecord, PickPopup, etc.

A still further aspect of the method and system of the invention is that it defines and extends a command language in URL format. The command language can uniquely identify large or small objects in the database, and determine or

```
<b><font size =4 color=990000><siebelField siebelName="_title" /></font></b>
<p>
<table width="100%" cellpadding=2 cellspacing=3 border=0>
    <tr>
        <td align=right valign=top>
            <font size=2 face=arial><b><siebelField siebelName="labelAccount" /></b></font>
        </td>
        <td align=left valign=top>
            <siebelField siebelName="Account" />
        </td>
        <td align=right valign=top>
            <font size=2 face=arial><b><siebelField siebelName="labelSite" /></b></font>
        </td>
        <td align=left valign=top>
            <siebelField siebelName="Site" />
        </td>
        <td align=right valign=top>
            <font size=2 face=arial><b><siebelField siebelName="Name" /></b></font>
<!-Other fields omitted here . . . ->
    </tr>
</table>
```

This HTML layout file would produce a page as shown in FIG. 2.

A web designer can spend some effort, and create a very attractive page layout using this mechanism.

The tags provide a mechanism to uniquely identify Objects in a Repository from large to small. E.g., Views, Applets, Fields within Applets, and other objects. This is done while the hierarchical nature of the tags, thereby providing a mechanism to reference from large to small objects. Additionally, the tags provide directives to the web engine as to what data to fetch and integrate into the page.

A further aspect of our invention is that the tags are integrated closely into the native file format. For purposes of illustration only, it is HTML. In fact, the markup language does not have to be HTML, but can be any text file format, specify what action/command the web engine is to perform on the objects. The use of the URL formats serves two purposes. First, it is an intermediate format to translate the tags into. Second, URL is a command language understood by the web engine to perform operations on the application server.

While the invention has been described with respect to certain preferred embodiments and exemplifications, it is not intended to limit the scope of the invention thereby, but solely by the claims appended hereto.

I claim:

1. A method in a computing system for processing a received web server request, comprising, in a single web server program:

retrieving a template file identified by the received web server request, the retrieved template file containing an embedded tag;

transforming the tag embedded in the retrieved template file into one or more commands for an application server program;

transmitting the commands into which the tag has been transformed to the application server program;

receiving from the application server program one or more objects provided by the application server program in response to the transmitted commands; and satisfying the received web server request with the received objects.

2. The method of claim 1 wherein the web server request is received from a web client program, and wherein satisfying the web server request includes transmitting the received objects to the web client program.

3. The method of claim 1, further comprising, before satisfying the received web server request with the received objects, converting the received objects into a markup language.

4. The method of claim 1 wherein the command into which the tag is transformed is an object call command identifying an object to be called by the application server program.

5. The method of claim 4 wherein the transformed tag has the format

<TagCall TagNameCall="TagName"/> where TagCall identifies a type of object to be called, and TagName identifies a specific object to be called.

6. The method of claim 1 wherein each of the received objects is of a type selected from a group consisting of views, applets, fields, data, and links.

7. The method of claim 1 wherein the web server request is received from a web client program, and wherein contents of the tag embedded in the retrieved template is based upon information received from the web client program.

8. A computer-readable medium whose contents cause a computing system to process a received web server request by, in a single web server program:

loading a template file containing an embedded tag;

transforming the tag embedded in the retrieved template file into one or more commands for an application server;

forwarding the commands into which the tag has been transformed to the application server;

receiving from the application server an object provided by the application server program in response to the transmitted commands; and satisfying the received web server request with the received object.

9. The computer-readable medium of claim 8 wherein the web server request is received from a web client, and wherein satisfying the web server request includes transmitting the received objects to the web client.

10. The computer-readable medium of claim 8 wherein the contents of the computer-readable medium further cause the computing system to, before satisfying the received web server request with the received objects, convert the received objects into a markup language.

11. The computer-readable medium of claim 8 wherein the command into which the tag is transformed is an object call command identifying an object to be called by the application server program.

12. The computer-readable medium of claim 11 wherein the transformed tag has the format <A TagNameCall="B"/> where A identifies a type of object to be called, and B identifies a specific object to be called.

13. The computer-readable medium of claim 8 wherein each of the received objects is of a type selected from the group consisting of views, applets, fields, data, and links.

14. The computer-readable medium of claim 8 wherein the web server request is received from a web client program, and wherein contents of the tag embedded in the retrieved template is based upon information received from the web client program.

15. A system for processing a web server request, comprising:

a web server comprising:
  a request receiver that receives the web server request referencing a template file,
  a template file memory that contains the referenced template file, a tag being embedded in the contained referenced template file that identifies an application object, and
  an object requesting subsystem that requests from an application server the application object identified in the embedded tag; and an application server comprising:
  an object provision subsystem that returns the application object requested by the web server, the web server further comprising a request satisfaction subsystem that satisfies the received web server request with the application object returned by the application server.

16. The system of claim 15 wherein the receiving subsystem receives the web request from an originator, and wherein the web server's request satisfaction subsystem comprises:

a transformation subsystem for transforming the returned application object into a markup language representation; and a sending subsystem that sends the markup language representation of the application object generated by the transformation subsystem to the originator.

17. The system of claim 15, further comprising a web client that originates the web server request received by the request receiver, and that receives the application object.

18. The system of claim 15 wherein the object provision subsystem returns application objects of one or more types selected from a group consisting of: views, applets, fields, data, and links.

19. One or more computer memories collectively containing a web document template data structure, the data structure comprising:

content expressed in a markup language; and at least one application object reference tag, the application object reference tag identifying an application object, such that a web server may parse the data structure to select each application object reference tag, obtain the application object identified by each selected the application object reference tag from an application server, and incorporate the retrieved application object into the content.

20. The computer memories of claim 19 wherein each application object reference tag has the format <A TagNameCall="B"/> where A identifies a type of application object to be obtained from the application server, and B identifies a specific object to be obtained from the application server.

21. One or more generated data signals collectively conveying a web document data structure, comprising content encoded in a markup language, the content including a representation of an application object obtained by a web server computer system from an application server computer system based upon the occurrence of a tag specifying the application object within a template from which the web document data structure was generated, such that the contents of the data structure may be rendered by a web document browser to display content including the representation of the application object.

* * * * *